United States Patent [19]

Chang

[11] Patent Number: 5,785,291
[45] Date of Patent: Jul. 28, 1998

[54] SEAT SUPPORT AND SLIDE MECHANISM

[76] Inventor: Chung L. Chang, 22834 Lazy Trail Rd., Diamond Bar, Calif. 91765

[21] Appl. No.: 705,384

[22] Filed: Aug. 29, 1996

[51] Int. Cl.$^6$ .................................................. F16M 13/00
[52] U.S. Cl. ........................... 248/429; 248/430; 297/341
[58] Field of Search .................................. 248/429, 430; 297/341, 317, 318

[56] References Cited

U.S. PATENT DOCUMENTS

| | | | |
|---|---|---|---|
| 4,101,169 | 7/1978 | Muraishi et al. | 297/341 |
| 4,423,904 | 1/1984 | Crawford | 297/341 |
| 4,497,518 | 2/1985 | Nishimura et al. | 297/341 |
| 4,615,551 | 10/1986 | Kinaga et al. | 297/341 |
| 4,621,867 | 11/1986 | Perring et al. | 297/341 |
| 4,635,890 | 1/1987 | Matsuda | 248/429 X |
| 4,660,795 | 4/1987 | Ikegaya et al. | 248/430 X |
| 4,671,571 | 6/1987 | Gionet | 297/341 |
| 4,673,217 | 6/1987 | Nishiyama et al. | |
| 4,707,030 | 11/1987 | Harding | 297/341 |
| 4,856,847 | 8/1989 | Kanai | 297/341 |
| 4,881,774 | 11/1989 | Bradley et al. | 297/341 |
| 4,881,781 | 11/1989 | Borlinghaus et al. | 248/430 X |
| 4,909,570 | 3/1990 | Matsuhashi | 297/341 |
| 4,940,285 | 7/1990 | Suzuki et al. | 248/430 X |
| 5,020,853 | 6/1991 | Babbs | 297/341 |
| 5,052,751 | 10/1991 | Hayakawa et al. | 297/341 |
| 5,076,529 | 12/1991 | Dove et al. | 248/429 |
| 5,102,197 | 4/1992 | Itsuki | |
| 5,137,331 | 8/1992 | Colozza | 297/341 |
| 5,322,348 | 6/1994 | Johnson et al. | 248/430 X |
| 5,352,019 | 10/1994 | Bauer et al. | 297/341 |
| 5,425,522 | 6/1995 | Retzlaff | 248/429 |

FOREIGN PATENT DOCUMENTS 1007119  10/1965  United Kingdom.

OTHER PUBLICATIONS

U.S. application No. 08/390,708—Chang—filed Feb. 17, 1995.

Figures 1–3 of Rockwell Part No. 46404 POB.

Primary Examiner—Peter M. Cuomo
Assistant Examiner—Rodney B. White
Attorney, Agent, or Firm—Knobbe, Martens, Olson & Bear, LLP

[57] ABSTRACT

A support assembly for a vehicle seat, including a first slide mechanism adapted to be mounted under one side of the seat, a second slide mechanism adapted to be mounted under a seat opposite said first slide mechanism, and a lock connecting the first and second slide mechanisms. The first and second slide mechanisms include a support defining a track and a bracket slidable along the track in the directions of relative motion parallel to one another. The lock includes a first and second series of stations fixed with respect to the respective supports and first and second latches pivotally mounted to respective seat brackets which are engageable with said series of stations. The latches are pivotally mounted about a first and second axis of rotation external their respective slide mechanisms parallel to one another. A mechanical actuator connected to the lock, including a portion extending outboard of the first outboard side of the assembly, such that movement of the portion of the actuator in the direction toward the first outboard side moves the lock between an unlocked position and a unlocked position.

20 Claims, 5 Drawing Sheets

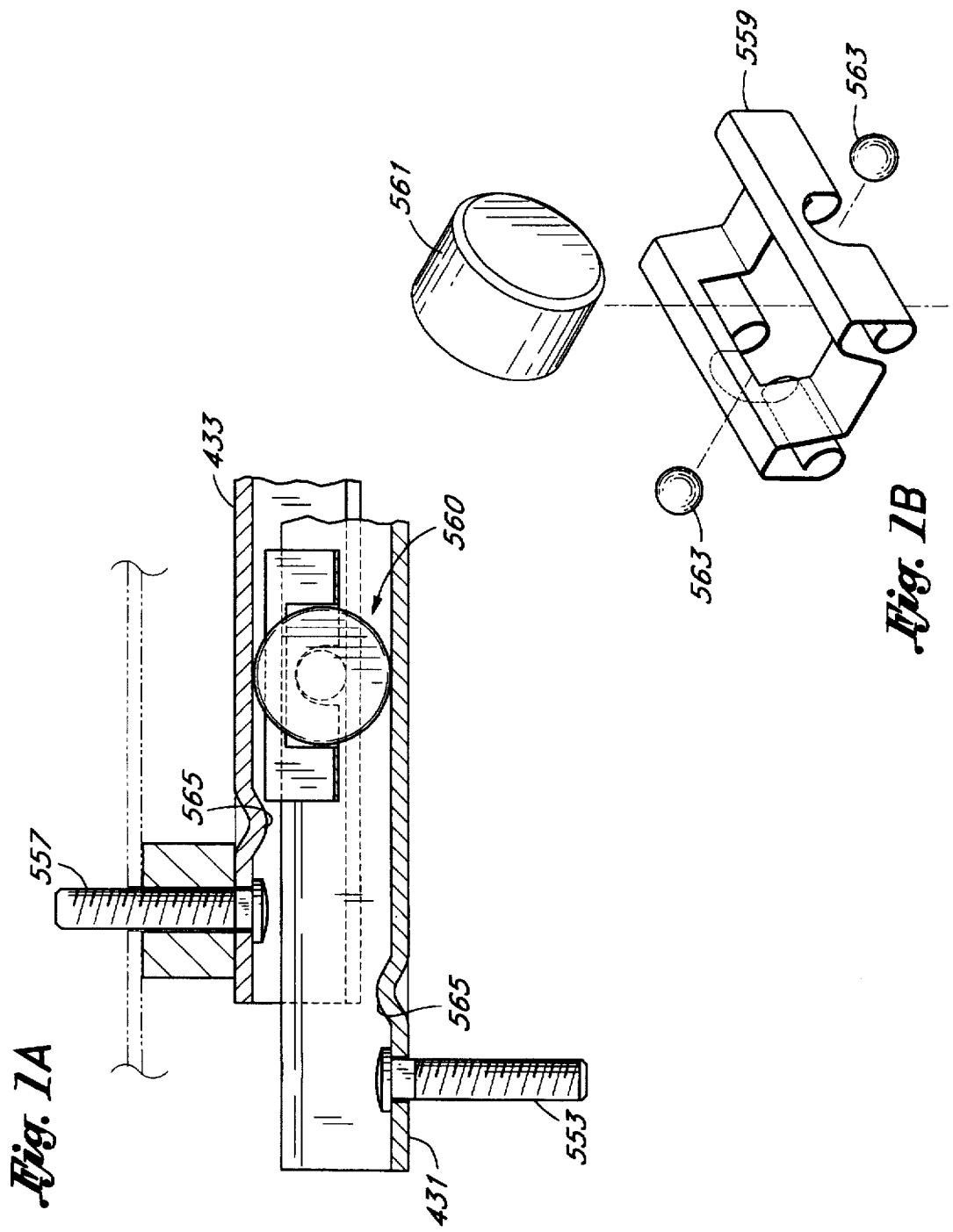

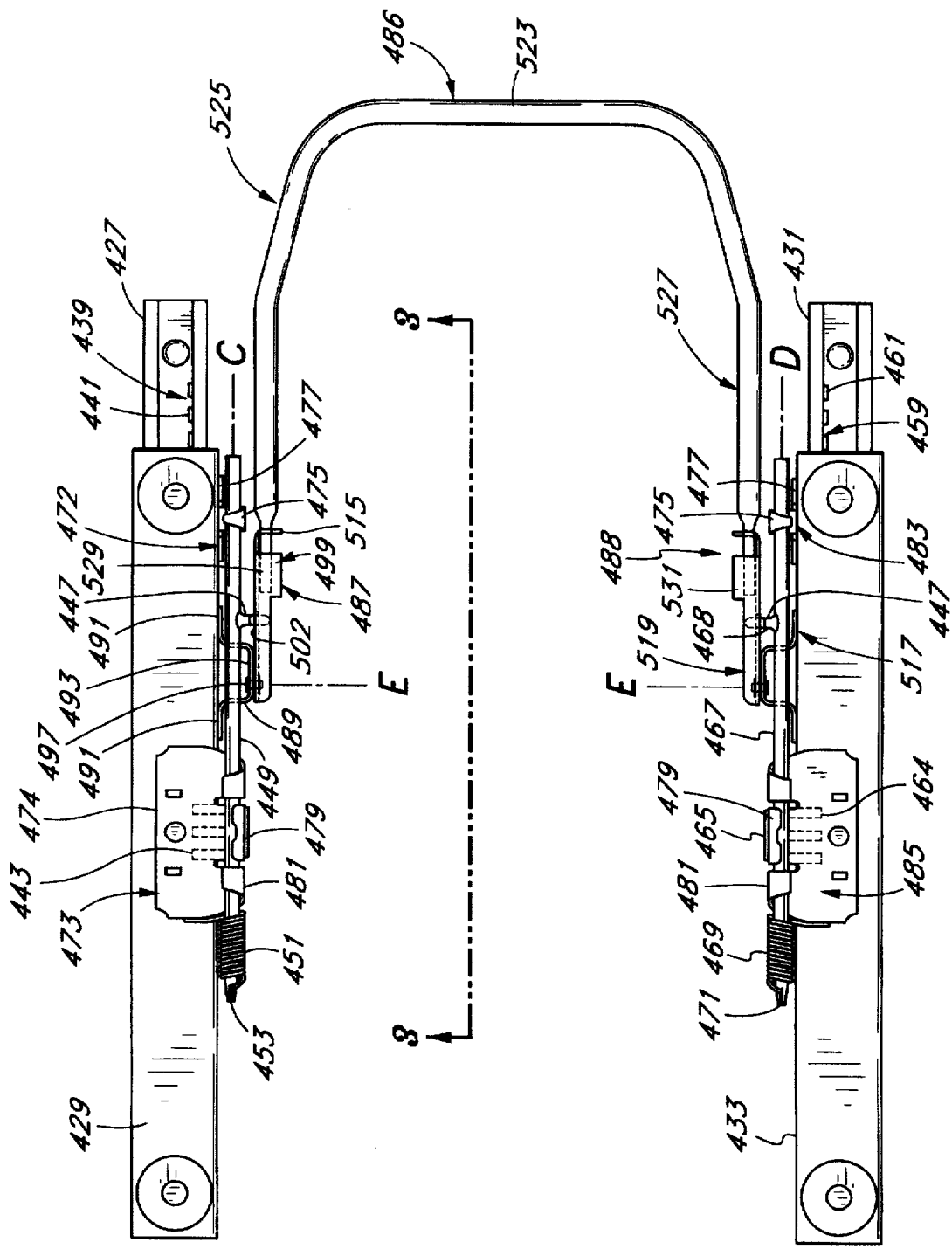

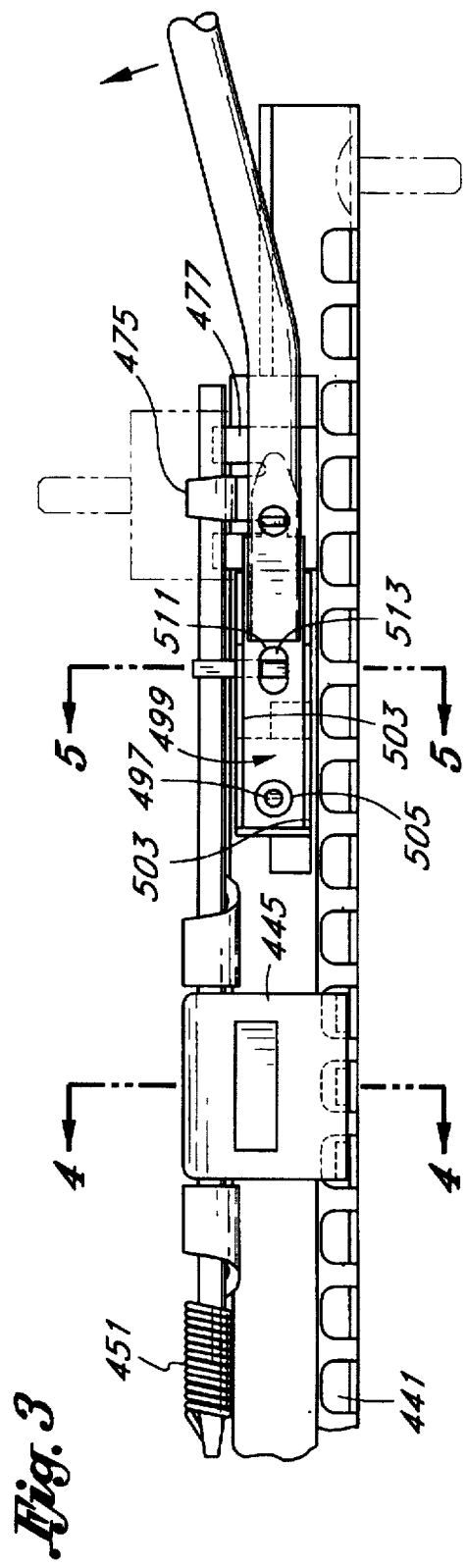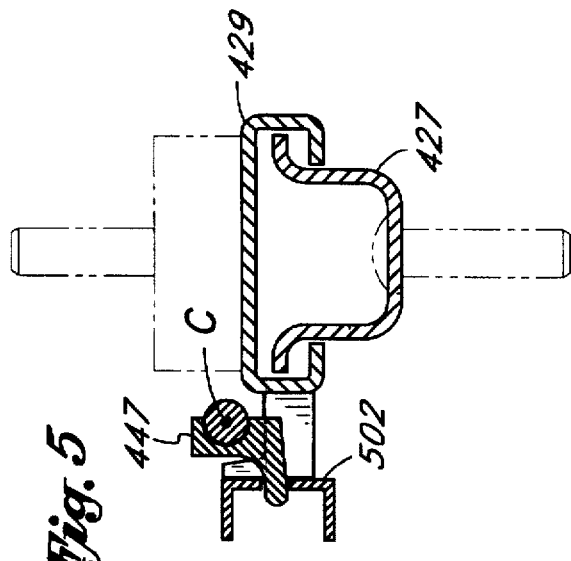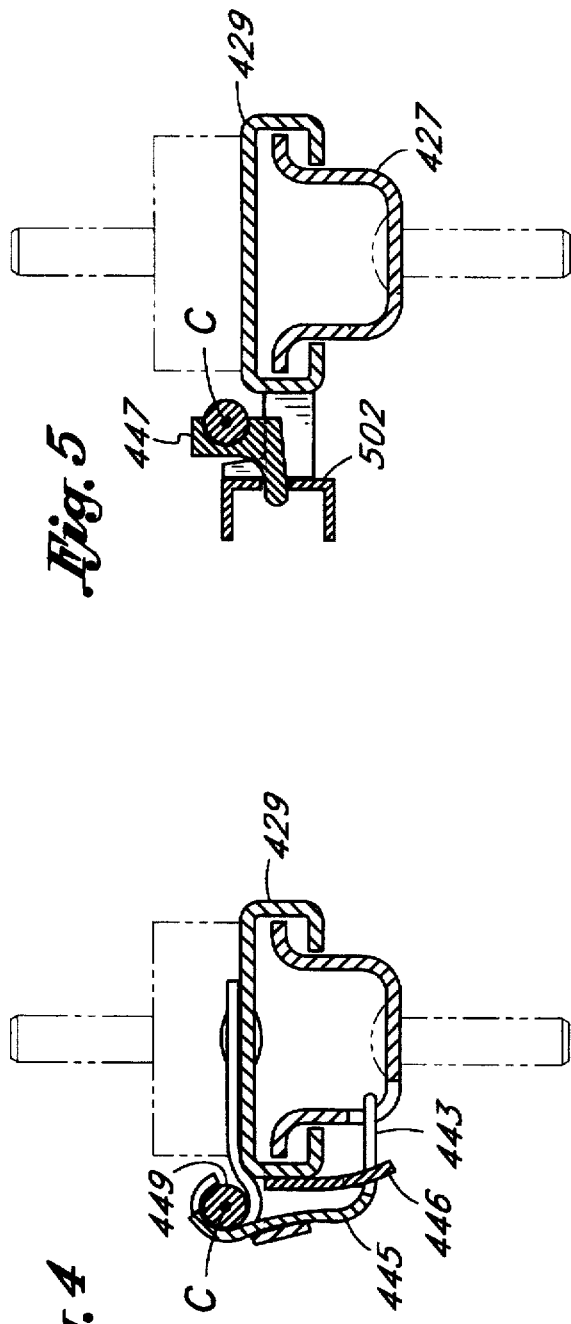

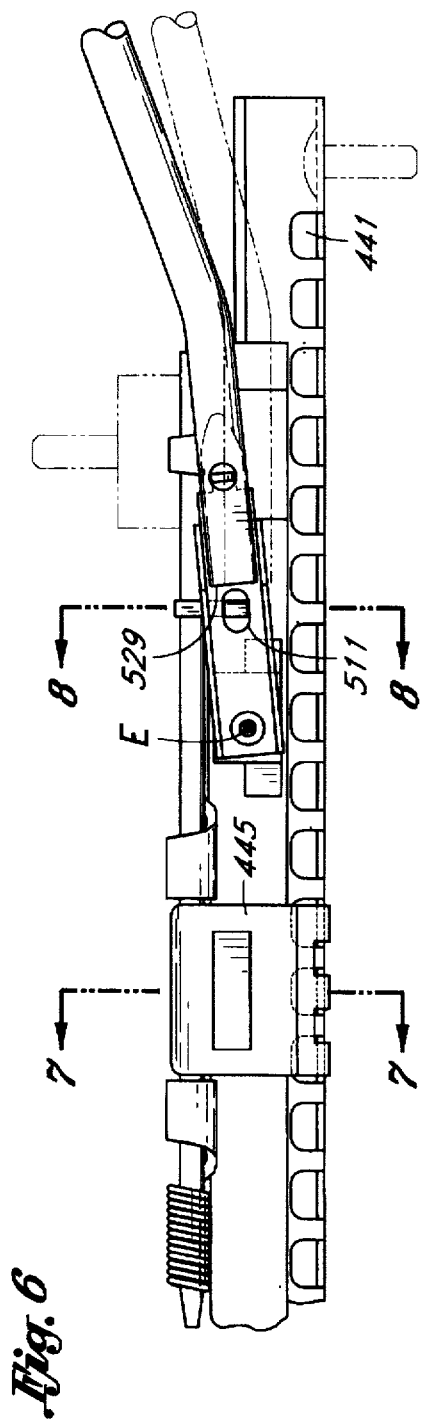
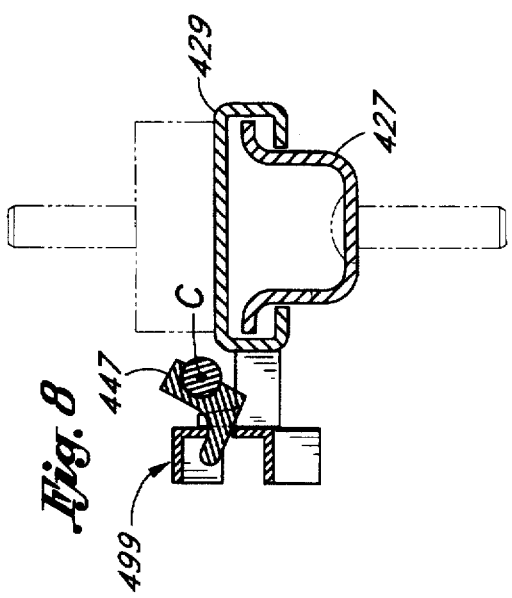
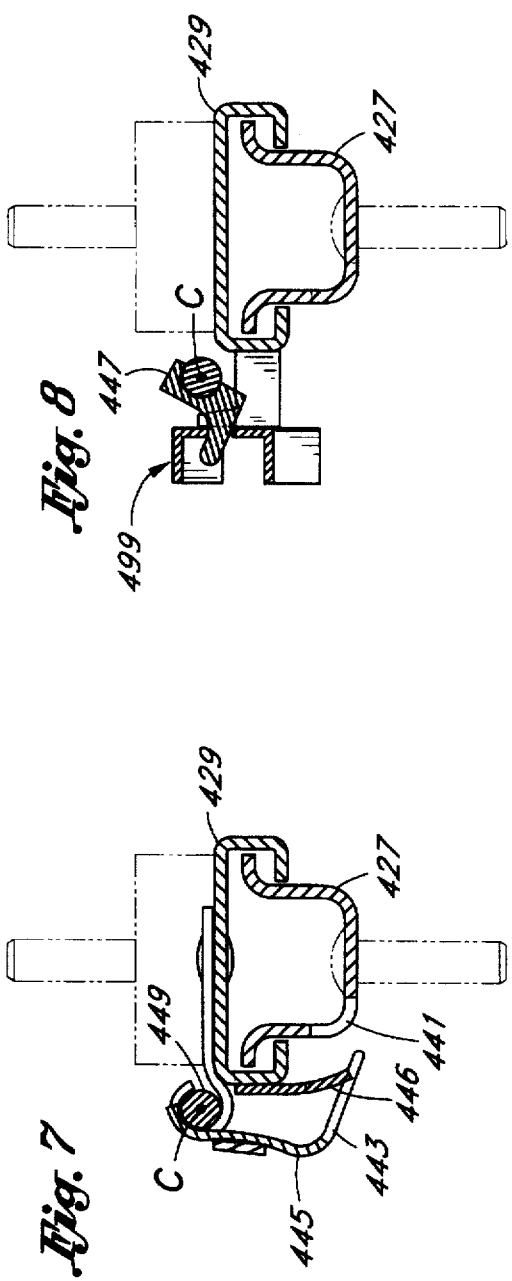

5,785,291

SEAT SUPPORT AND SLIDE MECHANISM

FIELD OF THE INVENTION

This invention relates to the field of seat supports and, in particular, to slidable vehicle seat supports.

BACKGROUND AND SUMMARY OF THE INVENTION

Vehicle seat supports typically include a slide assembly which permits the seat to slide forward or rearward both for comfort and to permit the driver of the vehicle to reach the vehicle controls. As it is typical for a vehicle to be used by a number of drivers, it is important that the support mechanism be easily adjusted yet securely lock the seat in place to avoid impairing the driver's ability to control the vehicle during a sudden stop.

While slide assemblies with electronic actuators are well known, they tend to be significantly more complex and expensive than slide assemblies utilizing mechanical actuators (i.e., actuators not including electronic components). In view of this added cost and possibility of electrical failure, most automobiles utilize slide assemblies with mechanical actuators.

One particularly popular slide assembly includes a first slide mechanism, a second slide mechanism, and a lock which selectively prevents movement of both the first and the second slide mechanisms. The lock is actuated by a U-shaped handle which extends between and is rotatably mounted on the slide mechanisms. The first slide mechanism includes a first support defining an elongate track and a first bracket which is slidably mounted within the first support. The second slide mechanism includes a second support which defines a second track and a second bracket slidably mounted within the second support.

The relative movement of the slide mechanisms is controlled by respective lock assemblies. Each lock assembly includes a pivot shaft mounted in a channel formed between its associated support and bracket. A pair of latch members are mounted on the pivot shaft and are rotatable therewith. The latch members extend through mating holes in the support, preventing their movement relative the support. The latch members may also be rotated into engagement with mating holes in the bracket to thereby prevent relative movement of the support and bracket. The latch members disengage the bracket holes in response to upward movement of the closed end of the U-shaped handle, but are generally biased into engagement with the holes in the bracket by a biasing member.

This support assembly has a number of advantages. Specifically, the actuation of the support assembly is particularly convenient, in that the actuating handle is easy to locate and grasp, and the lock is released by a simple upward movement. Unfortunately, the design also suffers from certain disadvantages.

For example, the slide assembly requires that exacting tolerances be maintained at several steps of the manufacturing and assembly process. Specifically, both the support and bracket must be held to relatively tight tolerances to prevent them from binding on the latch members and pivot shaft. In addition, the supports must be carefully aligned and mounted on the floor of the car to prevent torque from being applied to the slide mechanism during use. Similarly, care must be taken in the drilling of the mounting holes in the seat itself and in the process of mounting the seat to avoid misalignment which could apply torque to the slide mechanism and cause binding.

Another drawback to this slide assembly design is that the portion of the latch which is actually secured within the holes in the bracket is relatively small, thereby increasing the risk of accidental release of the assembly.

Accordingly, there remains a need for an improved vehicle support assembly.

SUMMARY OF THE INVENTION

The present invention is an improved support assembly for a seat having a novel structural configuration which provides the advantages of a central lift handle actuator without the drawbacks.

One aspect of the invention is a support assembly including a first slide mechanism, a second slide mechanism, a lock, and a handle. The first slide mechanism is adapted to be mounted onto one side of the seat and includes an elongate first support defining a first track and a first bracket slidable along the first track in a direction of relative motion. The second slide mechanism is adapted to be mounted under a seat opposite the first slide mechanism and comprises an elongate second support defining a second track and a second seat bracket slidable along the second track in the direction of relative motion. The lock includes a first interlocking member and a second interlocking member which mechanically coact to prevent movement of at least one of the first mechanism and the second mechanism in the direction of relative motion when the lock is in a first position and permit movement of at least one of the first mechanism and the second mechanism in the direction of relative motion when the lock is in a second position. The first interlocking member is rotatable about a first generally horizontal axis external the first slide mechanism (i.e., external the envelope defined by the first slide mechanism) and a handle connected to the lock is rotatable about a second generally horizontal axis transverse to the first axis, and movement of the handle about the second axis moves the lock between the first position and the second position.

Importantly, by positioning the first axis outside of the slide mechanism, the support assembly is particularly adapted to be manufactured and installed with the seat with less precision than is required by prior central lift handle designs. Likewise, this positioning facilitates having a larger amount of the first interlocking member engage the second interlocking member.

Advantageously, a portion of the handle may extend beyond the first end of the first mechanism to enhance its accessibility to the user. Desirably, the support assembly includes a third interlocking member and a fourth interlocking member which mechanically coact to prevent movement of the second mechanism in the direction of relative motion when the lock is in the first position, and the third interlocking member and the fourth interlocking member permit movement of the second mechanism in the direction of relative motion when the lock is in a second position, wherein further the third interlocking member is rotatable about a third generally horizontal axis external the second slide mechanism generally parallel to the axis about which the first interlocking member is rotatable.

Advantageously, the handle is generally U-shaped and defines a connecting portion, a first outer leg portion, and a second outer leg portion, and the assembly includes a first linkage and a second linkage. The first linkage connects the outer leg portion to the first interlocking member, and the second linkage connects the second outer leg portion to the fourth interlocking member.

Another aspect of the invention is a support assembly for a seat, including a first slide mechanism, a second slide mechanism, a lock, and an actuator. The first slide mechanism is adapted to be mounted under one side of the seat and includes a first support defining a first track and a first seat bracket slidable along the first track. The second slide mechanism is adapted to be mounted under a seat opposite the first slide mechanism and includes a second support defining a second track and a second seat bracket slidable along the second track, with the first slide mechanism and the second slide mechanism defining a first outboard side and a direction of relative motion. The lock selectively prevents movement of the first support relative the first bracket and the second support relative the second bracket. The lock includes a first series of stations fixed with respect to the first support, a first latch, a first mount, a first biasing member, a second series of stations, a second latch, a second mount, and a second biasing member. The first mount is fixed relative to the seat bracket, pivotably securing the first latch to the seat bracket such that the first latch is selectively pivotably engageable with each of the first series of stations about a first axis of rotation external the first slide mechanism. When the first latch is engaged with one of the series of stations, the first support is prevented from sliding with respect to the first bracket. The first biasing member is mounted on the first sliding mechanism, biasing the first latch into engagement with the first series of stations. The second series of stations is fixed with respect to the second support. The second mount is fixed relative to the seat bracket, pivotably securing the second latch to the seat bracket such that the second latch is pivotably engageable with each of the second series of stations about a second axis of rotation external the second slide mechanism and parallel to the first axis of rotation. When the second latch is engaged with one of the second series of stations, the second support is prevented from sliding with respect to the second bracket. The second biasing member mounted on the second sliding mechanism biases the second latch into engagement with one of the second series of stations. The actuator is connected to the lock and comprises a handle having a first end connected to the first latch and a second end connected to the second latch. The handle is pivotable about a third axis transverse to the first axis and the second axis between a first position wherein the first latch is prevented from engaging one of the first series of stations and the second latch is prevented from engaging one of the second series of stations, and a second position wherein the first latch is permitted to engage one of the first series of stations and the second latch is permitted to engage one of the second series of stations.

These and other aspects of the present invention will now be discussed in connection with a preferred embodiment, which is intended to illustrate, but not limit the scope of, the present invention.

BRIEF DESCRIPTION OF THE DRAWINGS

FIGS. 1a and 1b are sectional views illustrating the stop mechanism of the assembly of FIG. 1.

FIG. 2 is a top view of the support assembly of FIG. 2.

FIG. 3 is an enlarged partial elevational view along 4—4 of FIG. 2, illustrating the assembly in its locked position.

FIG. 4 is a sectional view taken along 5—5 of FIG. 4.

FIG. 5 is a sectional view taken along 6—6 of FIG. 4.

FIG. 6 is an enlarged partial elevational view similar to that of FIG. 3, but illustrating the assembly in its unlocked position.

FIG. 7 is a sectional view taken along 8—8 of FIG. 7.

FIG. 8 is a sectional view taken along 9—9 of FIG. 7.

DETAILED DESCRIPTION OF THE PREFERRED EMBODIMENT

Figure 1:
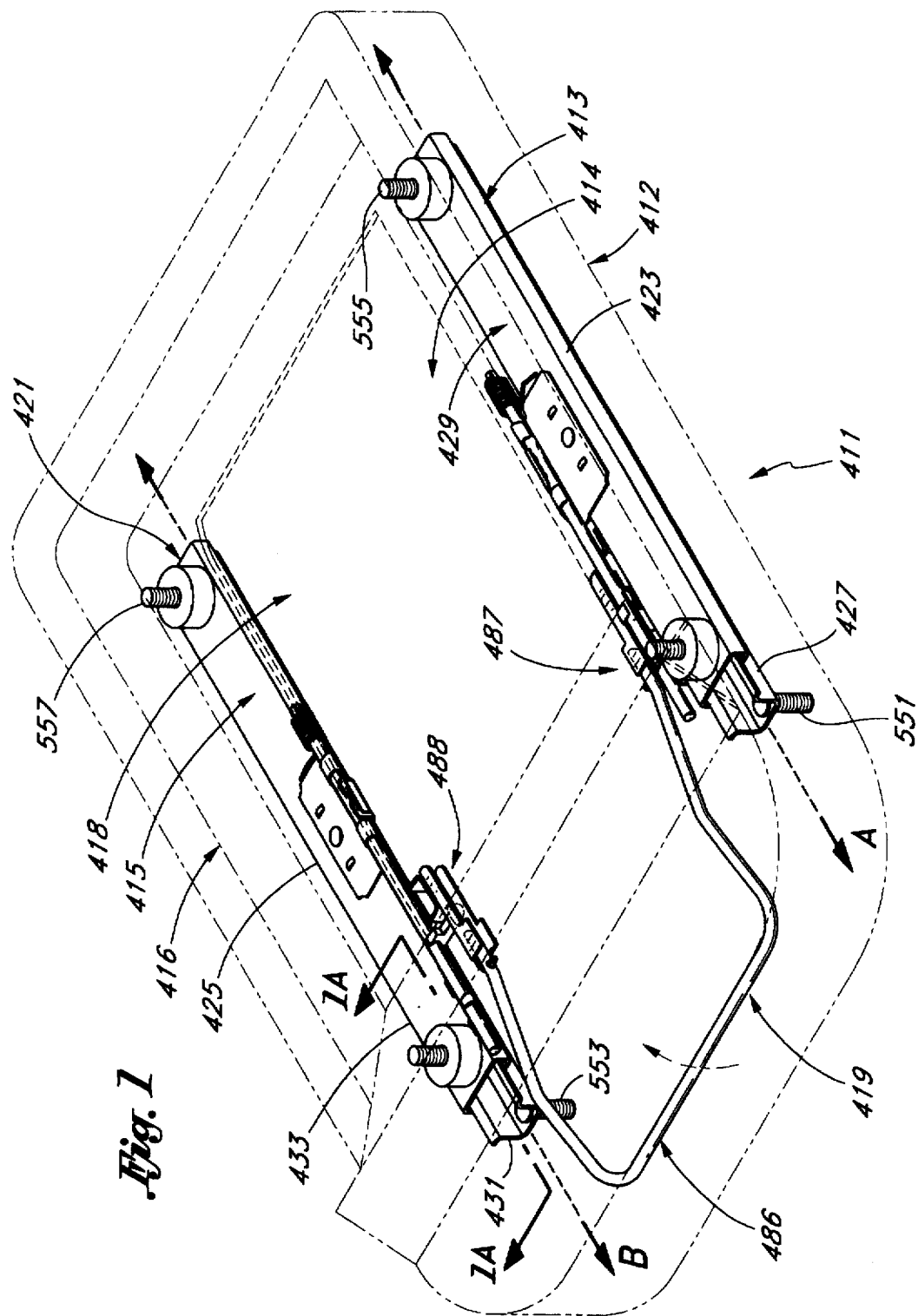
FIG. 1 is a perspective view of a preferred support assembly for a seat of the present invention.

FIGS. 1–8 illustrate a preferred support assembly 411 of the present invention. The support assembly includes a first slide mechanism 413, a second slide mechanism 415, and a lock and an actuator (described in detail below). The support assembly has a first end 419, a second end 421, a first side 423, and a second side 425.

The first slide mechanism 413 includes a first elongate metal support 427 having a generally inverted omega-shaped cross section, as is known in the art. This first support 427 defines a first track and slidably receives and retains a first elongate rigid metal seat bracket 429 having a generally C-shaped cross section, as is likewise known in the art. The second slide mechanism 415 includes a similarly shaped elongate second support 431 defining a second track and a second bracket 433 slidable along said second track. The first bracket 429 is slidable along the first track along the axis of symmetry A of the first support 427. Likewise, the second seat bracket 433 is slidable along the second track along the axis of symmetry B of the second support 431, which is parallel to the axis of symmetry of the first support 427. These axes each define a direction of relative motion corresponding to the direction in which a seat mounted on the brackets is movable relative the supports. This direction of relative motion is the same for both slide mechanisms 413 and 415. The first slide mechanism 413 defines a first outboard side 412 and a first inboard side 414. Similarly, the second slide mechanism 415 defines a second outboard side 416 and a second inboard side 418. As used herein, "outboard side" refers to a position to the outer side of the axis of symmetry of a given track and "inboard side" refers to a position to the inner side of the axis of symmetry of a given track.

As will be discussed in detail below, the lock selectively prevents movement of the first support 427 relative the first bracket 429 and the second support 431 relative the second bracket 433. The lock comprises a multiplicity of components used to accomplish this end. Specifically, the lock includes a first strike portion 439 of the first support 427, which defines a first series of stations or apertures 441 for selectively receiving a fork-shaped engagement portion 443 of a first latch 445 (FIG. 4). A first reinforcement member 446 is secured to the first bracket 429 and reinforces the first engagement portion 443 when in a locked position. The first latch 445 is rotatably mounted to the first bracket 429 by a first pivot shaft 449 defining first axis C. The first pivot shaft 449 is desirably provided with a first L-shaped flange 447 extending approximately one-quarter inch before and approximately one-half inch from the axis C. A first biasing member 451 or helical spring is secured within a notch 453 in the second end of the first pivot shaft 448. The opposite end of the biasing member 451 is biased downward against the upper surface of the first bracket 229.

Similarly, the lock 417 includes a second strike portion 459 of the second support 431, which defines a second series of stations 461 or apertures for receivably retaining a second fork-shaped engagement portion 464 of a second latch 465. The second latch 465 is pivotably mounted on the second bracket 433 by means of a second pivot shaft 467 which defines a second axis D. The fork-shaped portion of the second latch 465 is biased into engagement with the second series of stations 461 of the second strike portion 459 by a second biasing member 469 attached at one end within a second notch 471 in the second end of the second pivot shaft 467 and having an opposite end biased downward against the upper surface of the second bracket 433. A second reinforcement member (not shown) is secured to the second bracket 433 and reinforces the second engagement portion 463 of the second latch 465 when in a locked position. The second pivot shaft 467 is desirably provided with a second L-shaped flange 468 extending approximately one-quarter inch below and one-half inch inward from the axis D.

The manner in which the respective pivot shafts 449 and 467 are mounted on the respective slide mechanisms, 413 and 415, will now be described. The first pivot shaft 449 is secured to the first mechanism 413 by first mount 472 and a second mount 473. The first mount 472 is fixed to the first inboard side of the first bracket 429 near the first end 419. The first mount 472 includes a first lower appendage 475 which wraps around the first pivot shaft 449 and a pair of planar outer appendages 477 which extend vertically upward above the upper surface of the first bracket which cooperate with the first lower appendage 475 to pivotally secure the forward end of the first pivot shaft 449. The second mount 473 includes a generally rectangular shaped body 474 fixed to the upper surface of the first bracket 429, a central generally cylindrical shaped appendage 479 wrapping around the pivot shaft from below and a pair of outer appendages 481 straddling the central lower appendage 479. The central lower appendage and the pair of outer appendages 481 cooperate to pivotally secure the rear end of the first pivot shaft 449. As seen in FIGS. 5 and 6, the first pivot shaft 449 is supported so that its axis C is positioned above and to the inboard side of the first bracket 429.

The second pivot shaft 467 is secured to the second slide mechanism 415 by a third mount 483 and a fourth mount 485. As the third mount 483 has a structure identical to that of the first mount 472 and the fourth mount 485 has a structure identical to the second mount 473, their respective structural elements are designated with like numbers in the Figures and the description of the structure will not be repeated here. Likewise, the third mount 483 and the fourth mount 485 secure the second pivot shaft 467 so that its axis D is positioned above and to the inboard side of the second bracket 433.

The first slide mechanism 413 and second slide mechanism 415 are connected to one another by means of a generally U-shaped handle 486 which is connected to the first slide mechanism 413 by means of a first linkage 487 and connected to the second slide mechanism 415 by means of a second linkage 488. The first linkage 487 includes a first spacer unit 489 secured to the inboard side of the first bracket 429. The first spacer unit includes a pair of generally L-shaped legs 491 and a connecting member 493 defining a planar alignment surface 495. The first spacer unit 489 further defines a first pivot arm 497 defining an axis E which extends generally perpendicular to the planar alignment surface 495. The first linkage 487 further includes a first connector 499 including a main portion 501 defining a planar alignment surface 502 adjacent the planar alignment surface 495 of the first spacer unit 489. The connector further comprises a pair of raised sidewalls 503 extending inward from the first slide mechanism. The first connector 499 includes a aperture 505 which extends over the first pivot arm 497 so that the first connector 499 is rotatable about the axis E. The first connector 499 is secured to the first pivot arm 497 by means of a washer and a C-clip.

The first connector 499 further defines an actuating surface 511 forward of the aperture 505. This actuating surface 511 defines an opening 513 through which the first flange 447 secured to the first pivot shaft extends. The forward end of the first connector 499 is further provided with a locking member 515 which extends inward from the main portion 501 of the first connector for purposes of locking the handle in place as discussed below.

The second linkage 488 is defined by a first spacer unit 517 and a second connector 519. The second spacer unit has a structure identical to the first spacer unit 489 and the second connector has a structure identical to the first connector 499. Accordingly, the description of the structure will not now be repeated.

The generally U-shaped handle 486 includes a connecting gripping portion 523 straddled by first lever arm 525 and a second lever arm 527. The first lever arm 525 defines a first open end 529 distal the gripping portion 523 and the second lever arm 527 defines a second open end 531 distal the gripping portion 523. The first end 529 of the first lever arm 525 is secured within the channel defined by the main portion 501 and raised side walls 503 of the first connector 499 and is locked in place by the locking member 515 which extends through a mating first four and 533 in the U-shape handle 486 proximate the first end 529 of the first lever arm 525. Similarly, the second lever arm 427 is secured within the channel formed by the main portion 501 and raised side walls 502 of the second connector 519 and is secured in place by a locking member 515 which extends through a second bore 535 formed in the second lever arm 527 proximate the second end 531 of the U-shape handle 486.

As in the prior art, the first slide mechanism 413 of the support assembly 411 may be secured to the floor of a vehicle by a first pair of support attachment bolts 551, and the second support 431 may be attached to the vehicle floor by a second pair of support attachment bolts 553. Likewise, the first bracket 429 may be secured to the vehicle seat (shown in phantom) by a first pair of bracket attachment bolts 555 and the second bracket 433 may be secured to the vehicle seat by a second pair of bracket attachment bolts 557.

Referring to FIGS. 1a and 1b, each slide mechanism 413 and 415 advantageously includes a pair of stop assemblies 560, including a carriage 559, a roller 561, and a pair of ball bearings 563. Advantageously, when the respective supports 427, 431 reach the maximum extension, forward or rearward, the stop assemblies 560 contact a stop 565, preventing further movement along the same direction by the brackets 429 and 433.

Operation

The operation of the assembly 411 will now be described with reference to FIGS. 1–9.

The user, typically seated upon a sitting platform secured to the support assembly 411 by means of attachment bolts 555 and 557 reaches downward to the front or first end 419 of the assembly 411 until the users' fingers extend around the gripping portion 523 of the U-shaped handle 486. The user then lifts the gripping portion 523 generally upward (in the direction of the arrow shown in FIG. 2). As the gripping portion 523 of the U-shaped handle 486 is lifted upward, the handle 486 causes the first connector 499 and second connector 519 to rotate about the linkage axis E. In the preferred embodiment, both the first connector 499 and second connector 519 rotate about the same axis. As the handle 486 and therefore the first linkage 487 and second linkage 488 move from the locked position illustrated in FIGS. 3–5 to the unlocked position shown in FIGS. 6–8, the actuating surfaces 511 of the first connector 499 and second connector 519 force the first L-shaped flange 447 and second L-shaped flange 468, respectively, to rotate about the axis C of the first pivot shaft 449 and axis D of the second pivot shaft 467, respectively.

When the force exerted on the gripping portion 523 causes the actuating surface 511 of the first connector 499 and second connector 519 to press against the first L-shaped flange 447 and second L-shaped flange 468 with sufficient force to overcome the biasing force of the first biasing member 451 and second biasing member 469 the first pivot shaft begins to rotate about its axis C in a clockwise direction (as shown in FIG. 5) so that the first engagement portion 443 of the first latch 445 disengages from the first series of stations 441 in the first striped portion 439 of the first support 427, until the engagement portion 443 is fully disengaged, as shown in FIGS. 6 and 7. Simultaneously, the force of the gripping portion 523 causes the second lever arm 527 of the U-shaped handle 486 to rotate the second connector 519 about the axis E of the pivot arm 497 of the second spacer unit 517 and when the actuating surface 511 of the second connector 519 exerts sufficient force on the second flange 468 to overcome the bias force of the second biasing member 469, the second pivot shaft 467 rotates about its axis D, so that the second engagement portion of the second latch 465 is fully disengaged from the second series of stations 461 in the second strike portion 459 of the second support 431 of the second mechanism 415.

In the unlocked or disengaged position illustrated in FIGS. 7–9, the seat secured to the first and second brackets 429 and 433 is easily moved forward or rearward in the direction of relative motion defined by the first slide mechanism and second slide mechanism 413 and 415. After the seat has been moved to its desired position, the user simply releases the gripping portion 523 of the U-shaped handle 486 and the first biasing member 451 and second biasing member 469 force the first pivot shaft 449 and second pivot shaft 467, respectively to rotate about their axes C and D, respectively, until the first latch 445 and second latch 465 engage a first series of stations 441 of the first strike portion 439 and the second series of stations 461 of the second strike portion 459, respectively. Simultaneously, the L-shaped flange 447 secured to the first pivot shaft 449 presses against the actuating surface 511 of the first connector 449 forcing the U-shaped handle downward to its relaxed and locked position.

Advantageously, the seat assembly of the present invention permits the seat assembly to be actuated by the standard upward movement of the gripping portion 523 of the U-shaped handle 486 while providing the advantages of a rotational seat assembly.

Advantageously, the support assembly utilizes relatively few and simple parts, so that the assembly is both reliable and inexpensive. Further, the assembly requires no modification to the basic seat or vehicle design.

Numerous variations and modifications can be made without departing from the spirit of the present invention. Therefore, it should be clearly understood that the forms of the present invention described above and shown in the figures of the accompanying drawings are illustrative only and are not intended to limit the scope of the present invention.

I claim:

1. A support assembly for a seat, comprising:
 a first slide mechanism adapted to be mounted under one side of a seat, said first mechanism having a first end and a second end and comprising:
  an elongate first support defining a first track;
  a first seat bracket slidable along said first track in a direction of relative motion;
 a second slide mechanism adapted to be mounted under a seat opposite said first slide mechanism, said second mechanism having a first end and a second end and comprising:
  an elongate second support defining a second track;
  a second seat bracket slidable along said second track in said direction of relative motion;
 a lock comprising a first interlocking member and a second interlocking member, said first interlocking member and said second interlocking member mechanically co-acting to prevent movement of at least one of said first mechanism and said second mechanism in said direction of relative motion when said lock is in a first position and said first interlocking member and said second interlocking member permitting movement of at least one of said first mechanism and said second mechanism in said direction of relative motion when said lock is in a second position, said first interlocking member being rotatable about a first generally horizontal axis said first generally horizontal axis being unlimited and continuously external said first slide mechanism and said second slide mechanism; and
 a handle connected to said lock rotatable about a second generally horizontal axis transverse to said first axis, movement of said handle about said second axis moving said lock between said first position and said second position.

2. The support assembly of claim 1, wherein a portion of said handle extends beyond said first end of said first mechanism.

3. The support assembly of claim 2, wherein said first interlocking member and said second interlocking member mechanically co-act to prevent movement of said first mechanism in said direction of relative motion when said lock is in said first position, said lock further comprising:
 a third interlocking member and a fourth interlocking member, said third interlocking member and said fourth interlocking member mechanically co-acting to prevent movement of said second mechanism in said direction of relative motion when said lock is in said first position and said third interlocking member and said fourth interlocking member permitting movement of said second mechanism in said direction of relative motion when said lock is in a second position, said third interlocking member being rotatable about a third generally horizontal axis said third generally horizontal axis being unlimited and continuously external said first slide mechanism and said second slide mechanism generally parallel to said first axis.

4. The support assembly of claim 3, wherein said handle is generally U-shaped and defines a connecting portion, a first outer leg portion and a second outer leg portion, said assembly further comprising:
 a first linkage connecting said first outer leg portion to said first interlocking member; and
 a second linkage connecting said second outer leg portion to said fourth interlocking member, and wherein said connecting portion extends beyond said first end of said first mechanism.

5. The assembly of claim 4, wherein said first linkage comprises a first pivot shaft mounted to said first bracket defining said first axis and said second linkage comprises a second pivot shaft mounted to said second bracket defining said second axis.

6. The assembly of claim 5, wherein said first linkage comprises a first portion defining a first actuating surface generally fixed with respect to said handle and a first flange extending radially from said first pivot shaft, whereby movement of said handle forces said first actuating surface against said first flange, and wherein said second linkage comprises a second portion defining a second actuating surface generally fixed with respect to said handle and a second flange extending radially from said second pivot shaft, whereby movement of said handle forces said second actuating surface against said second flange.

7. The support assembly of claim 1, wherein said first axis and said second axis are perpendicular.

8. A support assembly for a seat, comprising:
   a first slide mechanism adapted to be mounted under one side of a seat, said first mechanism having a first end and a second end and comprising:
      an elongate first support defining a first track;
      a first seat bracket slidable along said first track in a direction of relative motion;
   a second slide mechanism adapted to be mounted under a seat opposite said first slide mechanism, said second mechanism having a first end and a second end and comprising:
      an elongate second support defining a second track;
      a second seat bracket slidable along said second track in said direction of relative motion;
   a lock comprising a first interlocking member and a second interlocking member, said first interlocking member and said second interlocking member mechanically co-acting to prevent movement of at least one of said first mechanism and said second mechanism in said direction of relative motion when said lock is in a first position and said first interlocking member and said second interlocking member permitting movement of at least one of said first mechanism and said second mechanism in said direction of relative motion when said lock is in a second position, said first interlocking member being rotatable about a first generally horizontal axis external said first slide mechanism and said second slide mechanism; and
   a handle connected to said lock rotatable about a second generally horizontal axis transverse to said first axis, movement of said handle about said second axis moving said lock between said first position and said second position, wherein said first axis and said second axis are perpendicular.

9. The support assembly of claim 8, wherein a portion of said handle extends beyond said first end of said first mechanism.

10. The support assembly of claim 9, wherein said first interlocking member and said second interlocking member mechanically co-act to prevent movement of said first mechanism in said direction of relative motion when said lock is in said first position, said lock further comprising:
   a third interlocking member and a fourth interlocking member, said third interlocking member and said fourth interlocking member mechanically co-acting to prevent movement of said second mechanism in said direction of relative motion when said lock is in said first position and said third interlocking member and said fourth interlocking member permitting movement of said second mechanism in said direction of relative motion when said lock is in a second position, said third interlocking member being rotatable about a third generally horizontal axis external said first slide mechanism and said second slide mechanism generally parallel to said first axis.

11. The support assembly of claim 10, wherein said handle is generally U-shaped and defines a connecting portion, a first outer leg portion and a second outer leg portion, said assembly further comprising:
   a first linkage connecting said first outer leg portion to said first interlocking member; and
   a second linkage connecting said second outer leg portion to said fourth interlocking member, and wherein said connecting portion extends beyond said first end of said first mechanism.

12. The assembly of claim 11, wherein said first linkage comprises a first pivot shaft mounted to said first bracket defining said first axis and said second linkage comprises a second pivot shaft mounted to said second bracket defining said second axis.

13. The assembly of claim 12, wherein said first linkage comprises a first portion defining a first actuating surface generally fixed with respect to said handle and a first flange extending radially from said first pivot shaft, whereby movement of said handle forces said first actuating surface against said first flange, and wherein said second linkage comprises a second portion defining a second actuating surface generally fixed with respect to said handle and a second flange extending radially from said second pivot shaft, whereby movement of said handle forces said second actuating surface against said second flange.

14. A support assembly for a seat, comprising:
   a first slide mechanism adapted to be mounted under one side of a seat, comprising:
      a first support defining a first track;
      a first seat bracket slidable along said first track;
   a second slide mechanism adapted to be mounted under a seat opposite said first slide mechanism, comprising:
      a second support defining a second track
      a second seat bracket slidable along said second track, said first mechanism and said second mechanism defining a first outboard side and a second outboard side and a direction of relative motion;
   a lock selectively preventing movement of said first support relative said first bracket and said second support relative said second bracket, comprising:
      a first series of stations fixed with respect to said first support;
      a first latch;
      a first mount fixed relative to said seat bracket pivotably securing said first latch to said seat bracket such that said first latch is selectively pivotably engageable with each of said first series of stations about a first axis of rotation, said first axis being unlimited and continuously external said first slide mechanism, whereby when said first latch is engaged with one of said first series of stations, said first support is prevented from sliding with respect to said first bracket;
      a first biasing member mounted on said first sliding mechanism biasing said first latch into engagement with said first series of stations;
      a second series of stations fixed with respect to said second support;
      a second latch;
      a second mount fixed relative to said seat bracket pivotably securing said second latch to said seat bracket such that said second latch is pivotably engageable with each of said second series of stations about a second axis of rotation parallel to said first axis of rotation said second axis being unlimited and continuously external said second slide mechanism, whereby when said second latch is engaged with one of said second series of stations, said second support is prevented from sliding with respect to said second bracket;

a second biasing member mounted on said second sliding mechanism biasing said second latch into engagement with one of said second series of stations;

an actuator connected to said lock, said actuator comprising a handle having a first end connected to said first latch and a second end connected to said second latch, said handle pivotable about a third axis transverse to said first axis and said second axis between a first position wherein said first latch is prevented from engaging one of said first series of stations and a said second latch is prevented from engaging one of said second series of stations, and a second position wherein said first latch is permitted to engage one of said first series of stations and said second latch is permitted to engage one of said second series of stations.

15. The support assembly of claim 14, wherein said first axis and said third axis are perpendicular.

16. The support assembly of claim 8, wherein a portion of said handle extends beyond a first end of said first mechanism.

17. The support assembly of claim 16, wherein said handle is generally U-shaped and defines a connecting portion, a first outer leg portion and a second outer leg portion, said assembly further comprising:

a first linkage connecting said first outer leg portion to a first portion of said lock; and a second linkage connecting said second outer leg portion to a second portion of said lock, wherein said connecting portion extends beyond said first end of said first mechanism.

18. The assembly of claim 17, wherein said first linkage comprises a first pivot shaft mounted to said first bracket defining said first axis and said second linkage comprises a second pivot shaft mounted to said second bracket defining said second axis.

19. The assembly of claim 18, wherein said first linkage comprises a first portion defining a first actuating surface generally fixed with respect to said handle and a first flange extending radially from said first pivot shaft, whereby movement of said handle forces said first actuating surface against said first flange, and wherein said second linkage comprises a second portion defining a second actuating surface generally fixed with respect to said handle and a second flange extending radially from said second pivot shaft, whereby movement of said handle forces said second actuating surface against said second flange.

20. A support assembly for a seat, comprising:

a first slide mechanism adapted to be mounted under one side of a seat comprising:
 a first support defining a first track,
 a first seat bracket slidable along said first track;

a second slide mechanism adapted to be mounted under a seat opposite said first slide mechanism, comprising:
 a second support defining a second track
 a second seat bracket slidable along said second track said first mechanism and said second mechanism defining a first outboard side and a second outboard side and a direction of relative motion;

a lock selectively preventing movement of said first support relative said first bracket and said second support relative said second bracket comprising:
 a first series of stations fixed with respect to said first support;
 a first latch;
 a first mount fixed relative to said seat bracket pivotably securing said first latch to said seat bracket such that said first latch is selectively pivotably engageable with each of said first series of stations about a first axis of rotation, said first axis being unlimited and continuously external said first slide mechanism, whereby when said first latch is engaged with one of said first series of stations, said first support is prevented from sliding with respect to said first bracket;
 a first biasing member mounted on said first sliding mechanism biasing said first latch into engagement with said first series of stations;
 a second series of stations fixed with respect to said second support;
 a second latch;
 a second mount fixed relative to said seat bracket pivotably securing said second latch to said seat bracket such that said second latch is pivotably engageable with each of said second series of stations about a second axis of rotation parallel to said first axis of rotation and external said second slide mechanism, whereby when said second latch is engaged with one of said second series of stations, said second support is prevented from sliding with respect to said second bracket;
 a second biasing member mounted on said second sliding mechanism biasing said second latch into engagement with one of said second series of stations;

an actuator connected to said lock, said actuator comprising a handle having a first end connected to said first latch and a second end connected to said second latch, said handle pivotable about a third axis transverse to said first axis and said second axis between a first position wherein said first latch is prevented from engaging one of said first series of stations and a said second latch is prevented from engaging one of said second series of stations, and a second position wherein said first latch is permitted to engage one of said first series of stations and said second latch is permitted to engage one of said second series of stations, wherein said first axis and said third axis are perpendicular.

* * * * *